(12) United States Patent
Ströer et al.

(10) Patent No.: US 12,296,909 B2
(45) Date of Patent: May 13, 2025

(54) BICYCLE BATTERY DEVICE

(71) Applicant: Canyon Bicycles GmbH, Koblenz (DE)

(72) Inventors: Moritz Ströer, Koblenz (DE); Philipp Müller, Nastätten (DE)

(73) Assignee: Canyon Bicycles GmbH, Koblenz (DE)

( * ) Notice: Subject to any disclaimer, the term of this patent is extended or adjusted under 35 U.S.C. 154(b) by 311 days.

(21) Appl. No.: 18/072,166

(22) Filed: Nov. 30, 2022

(65) Prior Publication Data

US 2023/0166804 A1 Jun. 1, 2023

(30) Foreign Application Priority Data

Dec. 1, 2021 (DE) ............. 20 2021 106 551.6

(51) Int. Cl.
| | |
|---|---|
| *B60K 1/04* | (2019.01) |
| *B60R 16/033* | (2006.01) |
| *B62J 43/10* | (2020.01) |
| *B62M 6/90* | (2010.01) |
| *H01M 50/233* | (2021.01) |
| *H01M 50/249* | (2021.01) |

(52) U.S. Cl.
CPC ............. *B62J 43/10* (2020.02); *B60R 16/033* (2013.01); *B62M 6/90* (2013.01); *H01M 50/233* (2021.01); *H01M 50/249* (2021.01); *B60L 2200/12* (2013.01); *H01M 2220/20* (2013.01)

(58) Field of Classification Search
CPC ........ B62J 43/10; B62M 6/90; H01M 50/233; H01M 50/249; H01M 2220/20
See application file for complete search history.

(56) References Cited

U.S. PATENT DOCUMENTS

| | | | |
|---|---|---|---|
| 2010/0237585 A1* | 9/2010 | Binggeli | B62K 19/30 |
| | | | 280/288.4 |
| 2011/0308871 A1 | 12/2011 | Hecken | |
| 2018/0043966 A1 | 2/2018 | Cunado Landa et al. | |
| 2023/0065830 A1 | 3/2023 | Hensolt | |

FOREIGN PATENT DOCUMENTS

| | | |
|---|---|---|
| DE | 102008047087 A1 | 3/2010 |
| DE | 102020001407 A1 | 9/2021 |
| EP | 2088068 A1 | 8/2009 |
| EP | 4140867 A1 | 3/2023 |
| GB | 2561012 A | 10/2018 |

\* cited by examiner

*Primary Examiner* — Jason D Shanske
*Assistant Examiner* — James J Triggs
(74) *Attorney, Agent, or Firm* — The Webb Law Firm

(57) ABSTRACT

A bicycle battery device includes a bicycle frame tube such as a down tube. A battery is insertable in the longitudinal direction of the bicycle frame tube through a battery opening. An adjustment element is arranged between the battery and an inner contour of the bicycle frame tube to simplify the adjustment.

10 Claims, 2 Drawing Sheets

BICYCLE BATTERY DEVICE

CROSS-REFERENCE TO RELATED APPLICATION

This application claims priority to German Patent Application No. 20 2021 106 551.6 filed Dec. 1, 2021, the disclosure of which is hereby incorporated by reference in its entirety.

BACKGROUND OF THE DISCLOSURE

Field of the Disclosure

The disclosure relates to a bicycle battery device.

Description of Related Art

In the case of e-bikes, it is known to place the battery on an upper side of the down tube, for example. Furthermore, it is known to arrange the battery inside the down tube, wherein such a bicycle frame is configured such that a lower end of the down tube ends below the bottom bracket housing so that the battery can be inserted into an opening provided at the lower end of the down tube in the longitudinal direction of the down tube. In particular due to the weight of the battery, assembly by sliding the battery in the longitudinal direction of the down tube is difficult, since, for example, tilting or jamming of the battery can occur during insertion.

SUMMARY OF THE DISCLOSURE

It is an object of the present disclosure to provide a bicycle battery device by means of which the assembly of the battery is simplified, in particular by insertion in the longitudinal direction of the bicycle frame tube.

The object is achieved with a bicycle battery device having the features as described herein.

The bicycle battery device according to the disclosure comprises a bicycle frame tube, in particular a down tube of a bicycle frame. Moreover, a battery is provided which is insertable into the bicycle frame tube in the longitudinal direction thereof through a battery opening. In order to simplify the insertion of the battery and, in particular, to ensure reliable adjustment of the battery inside the bicycle frame tube, an adjustment element is provided according to the disclosure, which is arranged between the battery and the bicycle frame tube. For reliable adjustment, the adjustment element preferably has an outer contour that at least partially corresponds to an inner contour of the bicycle frame tube. For example, the outer contour of the adjustment element has at least two contact surfaces that run parallel to corresponding inner surfaces of the inside of the bicycle frame tube. Said at least two contact surfaces can already be used for a good adjustment of the battery relative to the bicycle frame tube. It is preferred to provide more than two, in particular at least three such contact surfaces running parallel to corresponding inner surfaces of the inside of the bicycle frame tube.

In particular, the at least one adjustment element is a separate element independent of the battery. This has the particular advantage that the same batteries can be arranged in different bicycle frame tubes, i.e. bicycle frame tubes with different inner contours. The at least one adjustment element can be configured such that it is adapted to the inner contour of the bicycle frame tube. The adjustment element thus serves as a kind of adapter for receiving the same batteries in different frame tubes. This is particularly advantageous because batteries are bought-in parts, and in this respect, it is not necessary to design the battery or a battery housing for a specific bicycle frame tube. Rather, standard batteries, i.e., batteries having a predetermined housing or a fixed outer contour can be arranged in different bicycle frame tubes due to the provision of at least one adjustment element according to the disclosure.

The outer contour of the adjustment element can correspond substantially, in particular completely, to the inner contour of the bicycle frame tube. In relation to the circumference of the outer contour of the adjustment element, this thus corresponds to at least 80%, in particular at least 90% of the inner contour of the bicycle frame tube. Preferably, the adjustment element surrounds only part of the battery. In relation to the circumference of the outer contour of the adjustment element, this preferably corresponds to 30%-50% of the inner contour of the bicycle frame tube. It is particularly preferred that the adjustment element is U-shaped and is placed on a lateral surface of the battery so that the U-shaped projections protrude into adjacent lateral surfaces, in particular on both sides.

To ensure reliable adjustment and easy assembly by inserting the battery in the longitudinal direction, it is particularly preferred that a small distance is provided between the contact surfaces of the outer contour of the adjustment element and the corresponding surfaces of the inner contour of the bicycle frame tube. In this respect, manufacturing tolerances can be compensated for in a simple manner, since it is not absolutely necessary for simple assembly and also for adjustment that, for example, opposing contact surfaces abut against both opposing inner surfaces of the bicycle frame tube. In particular, the distance is in the range of 0-3 mm and particularly preferred 0-2 mm. Preferably, the distance is always >0 mm to avoid tilting when inserting the battery in the longitudinal direction. In particular, a distance of at least 0.5 mm is preferred. In a particularly preferred embodiment, the distance is thus 0.5-3 mm, in particular 0.5-2 mm.

The inner surface or inner contour of the bicycle frame tube is to be understood in the sense that it is defined, for example, not only by the inside of the bicycle frame tube itself, but also by elements arranged on the inside. For example, a cable duct extending in the longitudinal direction may be disposed on the inside of the bicycle frame tube. The inside or inner contour of the bicycle frame tube is thus formed in this region by the inside of the cable duct.

The adjustment element can be attached to the battery, for example fixedly connected, in that the adjustment element is glued to the outside of the battery, is connected thereto via latching elements or the like.

Preferably, the adjustment element is also screwed to the battery or battery housing, in particular for easy disassembly. This is particularly preferred if the adjustment element is cap-shaped or U-shaped.

In a preferred embodiment of the disclosure, the adjustment element is a separate element that is not fixedly connected to either the inside of the bicycle frame tube or the outside of the battery. Preferably, the adjustment element is detachably screwed to the battery. This can further simplify assembly.

It is preferred that the adjustment element has an inner contour that at least partially corresponds to an outer contour of the battery or the battery housing, respectively. This ensures that the outside of the battery at least partially abuts the inside of the adjustment element or runs parallel thereto with a small distance. This makes it possible, for example, to first insert the adjustment element into the bicycle frame tube and then insert the battery into the adjustment element.

The adjustment element preferably has at least two, in particular at least three contact surfaces which run parallel to corresponding outer surfaces of the battery or the battery housing, respectively. Here, it is again preferred that, according to the outer contour of the adjustment element, the inner contour of the adjustment element substantially, in particular completely corresponds to the outer contour of the battery. In the circumferential direction, the inner contour of the adjustment element corresponds to at least 80%, in particular at least 90% of the outer contour of the battery. In a particularly preferred embodiment, the adjustment element is configured such that it only partially surrounds the battery. In particular, the adjustment element has a U-shaped cross-section. In the circumferential direction, in a preferred embodiment, the inner contour of the adjustment element corresponds to 30%-50% of the outer contour of the battery.

Furthermore, in this embodiment, in which there is no fixed connection between the adjustment element and the battery, it is preferred that the inner contour of the adjustment element has a distance of 0-3 mm, in particular 0-2 mm, from the outer contour of the battery, at least in the region of the contact surfaces or corresponding surfaces, respectively. In particular, the distance is greater than 0 mm, in particular greater than 0.5 mm. Therefore, distances of 0.5-3 mm, in particular 0.5-2 mm, are particularly preferred.

The adjustment element may have a length that corresponds to at least 50% of the length of the battery. The adjustment element thus extends over at least half the length of the battery. Preferably, the adjustment element extends over at least 70% of the length of the battery. It is also possible, for example, to provide two or more adjustment elements arranged at different locations relative to the length of the battery. In particular, said elements have a length of 10 mm to 30 mm. Furthermore, it is possible for the outer contour of the adjustment element to change in the longitudinal direction so that the preferred contours described above are formed in such a way, for example, only in two regions, in particular in relation to the longitudinal direction at the end and at the beginning of the adjustment element. A tapering of the adjustment element could be provided in intermediate regions to facilitate insertion of the adjustment element in the longitudinal direction into the bicycle frame tube.

BRIEF DESCRIPTION OF THE DRAWING

In the following, the disclosure is described in more detail by means of preferred embodiments with reference to the accompanying drawings.

In the drawings.

DETAILED DESCRIPTION

Figure 1:
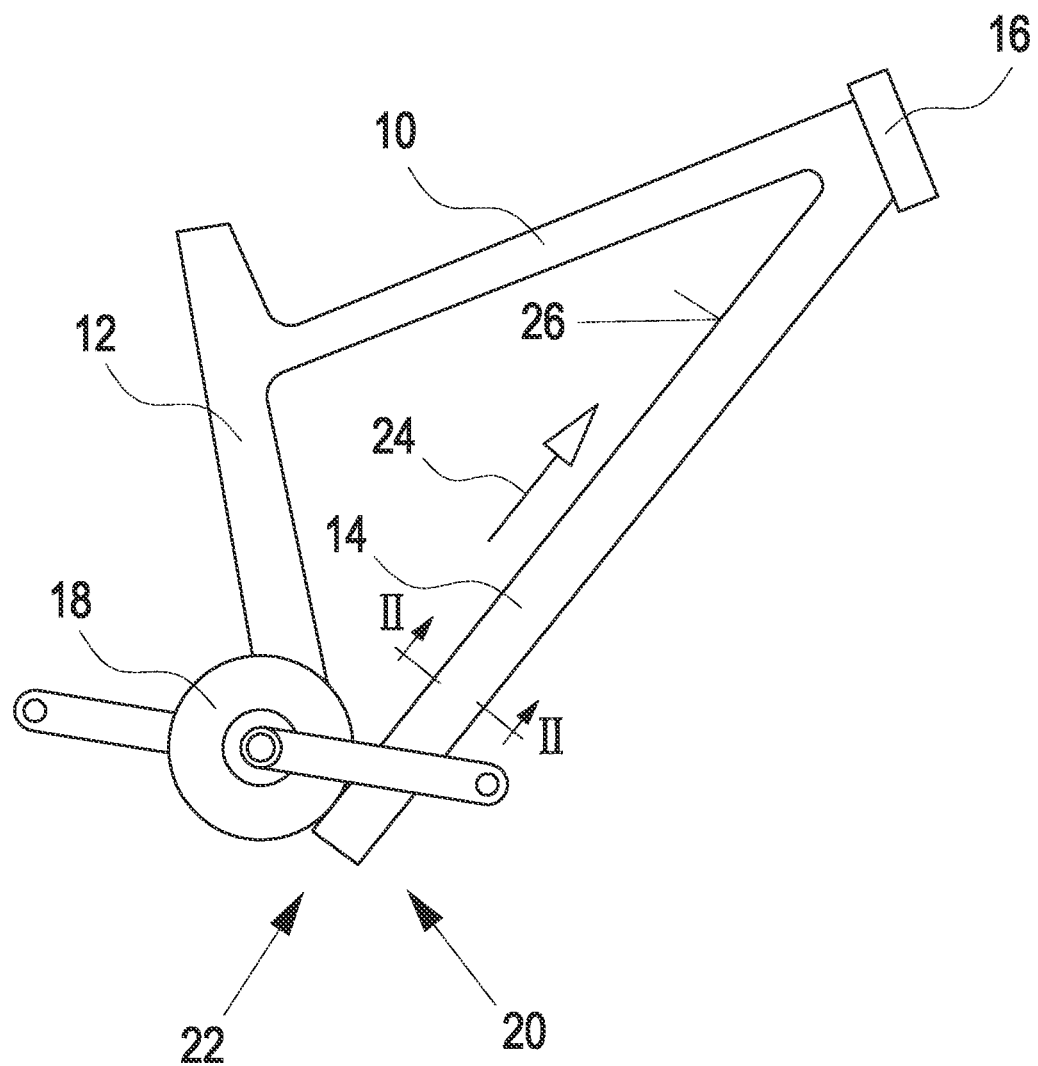
FIG. 1 is a greatly simplified schematic side view of a bicycle frame.

A bicycle frame usually comprises a top tube 10, a saddle tube 12 connected to top tube 10, a down tube 14 as well as a head tube 16 connected to top tube 10 and down tube 14. Moreover, a bottom bracket or motor housing 18 is provided for receiving an electric motor and for receiving the bottom bracket. Other frame geometries are also known. In the illustrated exemplary embodiment, down tube 14 is arranged such that a bottom-bracket-side end 20 of down tube 14 includes a battery opening 22. Thus, battery opening 22 is arranged at the lower end of down tube 14 with respect to a longitudinal direction 24 of the down tube. In the illustrated exemplary embodiment, a battery can be inserted into battery opening 22 from below in the longitudinal direction 24 into down tube 14.

Figure 2:
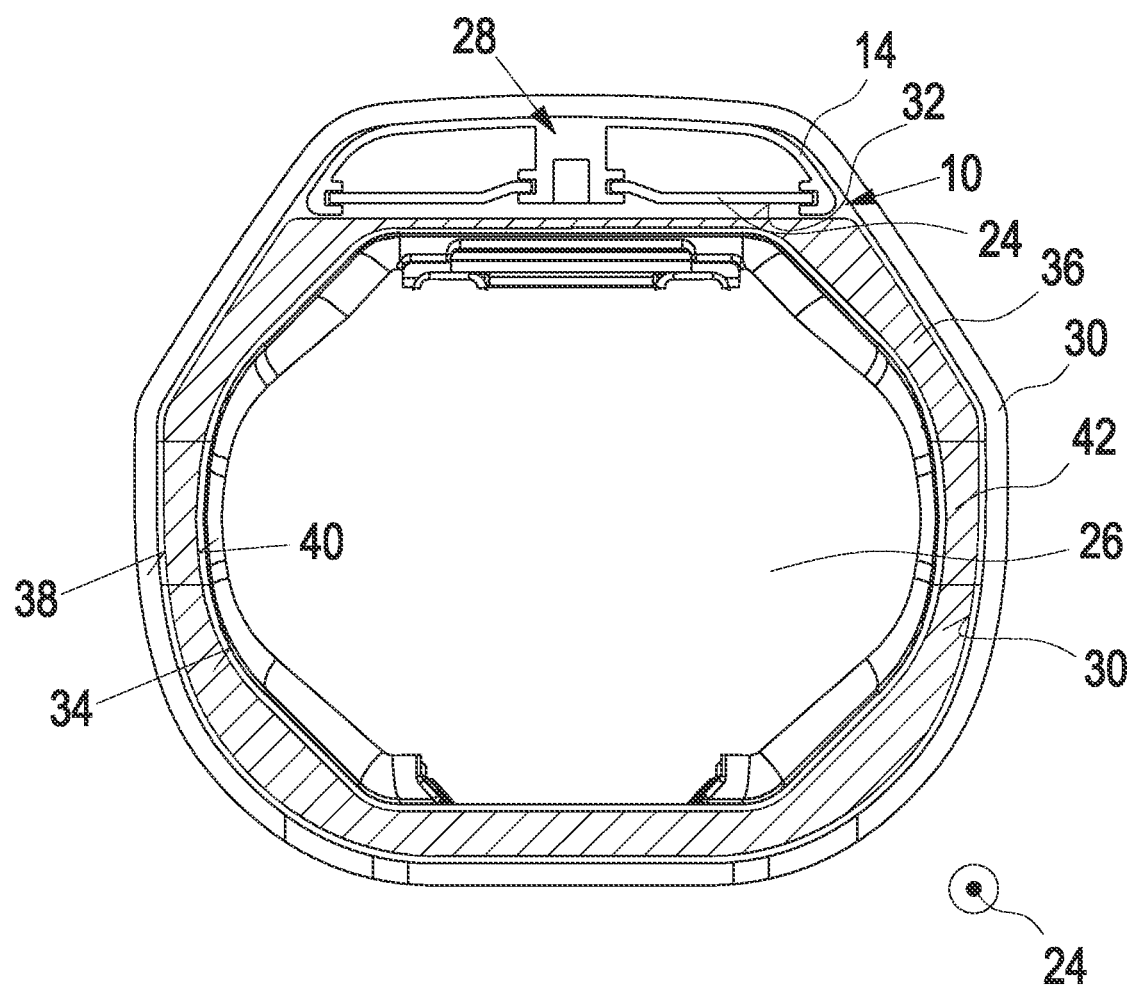
FIG. 2 is a schematic cross-section through the down tube of the bicycle frame.

In the cross-section through down tube 14 shown in FIG. 2, a battery 26 is arranged inside down tube 14 in the longitudinal direction 24. A cable duct 28 is arranged inside down tube 14 in the illustrated exemplary embodiment and also extends in the longitudinal direction 24. An inner contour 30 of down tube 14 is thus formed, on the one hand, by the inside of down tube 14 and, on the other hand, by an inside 32 of cable duct 28.

According to the disclosure, an adjustment element 36 is arranged between an outside of battery 26 forming an outer contour 34 with the housing of the corresponding battery housing and inner contour 30, 32 of down tube 14. In the illustrated exemplary embodiment, adjustment element 36 is annular in shape and completely encloses battery 26. In the illustrated exemplary embodiment, an outer contour 38 of adjustment element 36 runs parallel to inner contour 30, 32 of down tube 14. The two contours have a small distance to each other.

In the illustrated exemplary embodiment, adjustment element 36 is a separate element that is neither fixedly connected to down tube 14 nor to battery 26. Preferably, the adjustment element is screwed to the battery. An inner contour 40 of adjustment element 36 runs parallel to outer contour 34 of battery 26. A small distance is again provided between contours 34, 40.

As an alternative to the illustrated embodiment, the adjustment element may also surround only a part of the battery and is U-shaped in cross-section in particular. Such an element may enclose only one-third of the circumference of the battery. In particular, such an element encloses 30%-50% of the circumference of the battery. In the longitudinal direction, one or more such adjustment elements may be provided, which may have a length of only 10-30 mm.

The invention claimed is:

1. A bicycle battery device, comprising:
   a bicycle frame tube of a bicycle frame;
   a battery insertable into the bicycle frame tube in the longitudinal direction thereof through a battery opening; and
   an adjustment element arranged between the bicycle frame tube and the battery;
   wherein the adjustment element has an outer contour which at least partially corresponds to an inner contour of the bicycle frame tube, and
   wherein a distance between contact surfaces of the outer contour of the adjustment element and corresponding surfaces of the inner contour of the bicycle frame is 0.5-3 mm.

2. The bicycle battery device according to claim 1, wherein the outer contour comprises at least two contact surfaces running parallel to corresponding inner surfaces of the inner contour of the bicycle frame tube.

3. The bicycle battery device according to claim 1, wherein the outer contour of the adjustment element substantially corresponds to the inner contour of the bicycle frame tube.

4. The bicycle battery device according to claim 1, wherein the adjustment element has an inner contour that at least partially corresponds to an outer contour of the battery.

5. The bicycle battery device according to claim 4, wherein the inner contour of the adjustment element comprises at least two contact surfaces running parallel to the corresponding outer contour of the battery.

6. The bicycle battery device according to claim 4, wherein the inner contour of the adjustment element substantially corresponds to the outer contour of the battery.

7. The bicycle battery device according to claim 1, wherein several adjustment elements are provided that are arranged in the longitudinal direction of the battery.

8. The bicycle battery device according to claim 1, wherein the at least one adjustment element has a length in the longitudinal direction of the battery of 10 to 30 mm.

9. The bicycle battery device according to claim 1, wherein the adjustment element has a length of at least 50% of the length of the battery.

10. The bicycle battery device according to claim 1, wherein a distance between contact surfaces of the outer contour of the adjustment element and corresponding surfaces of the outer contour of the battery is 0.5-3 mm.

* * * * *